US011347505B2

(12) United States Patent
Kapoor et al.

(10) Patent No.: US 11,347,505 B2
(45) Date of Patent: *May 31, 2022

(54) PROCESSOR PERFORMANCE MONITOR THAT LOGS REASONS FOR RESERVATION LOSS

(71) Applicant: International Business Machines Corporation, Armonk, NY (US)

(72) Inventors: Shakti Kapoor, Austin, TX (US); Karen E. Yokum, Austin, TX (US); John A. Schumann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/743,628

(22) Filed: Jan. 15, 2020

(65) Prior Publication Data

US 2020/0150961 A1 May 14, 2020

Related U.S. Application Data

(63) Continuation of application No. 15/212,146, filed on Jul. 15, 2016, now Pat. No. 10,579,376.

(51) Int. Cl.
*G06F 9/30* (2018.01)
*G06F 11/30* (2006.01)
*G06F 11/34* (2006.01)
*G06F 12/0895* (2016.01)
*G06F 9/52* (2006.01)

(52) U.S. Cl.
CPC ........ *G06F 9/30043* (2013.01); *G06F 9/3004* (2013.01); *G06F 9/52* (2013.01); *G06F 11/3024* (2013.01); *G06F 11/3476* (2013.01); *G06F 12/0895* (2013.01); *G06F 2212/283* (2013.01)

(58) Field of Classification Search
CPC .......................... G06F 9/3004; G06F 9/30043
See application file for complete search history.

(56) References Cited

U.S. PATENT DOCUMENTS

| 6,629,210 B1 | 9/2003 | Arimilli et al. |
| 7,254,678 B2 | 8/2007 | Alexander et al. |
| 8,180,971 B2 | 5/2012 | Scott et al. |
| 8,244,988 B2 | 8/2012 | Cantin et al. |
| 8,688,661 B2 | 4/2014 | Greiner et al. |
| 9,053,035 B1 | 6/2015 | Mathur et al. |
| 2007/0124545 A1 | 5/2007 | Blanchard et al. |

(Continued)

OTHER PUBLICATIONS

Kapoor et al., "Processor Performance Monitor That Logs Reasons for Reservation Loss", U.S. Appl. No. 15/212,146, filed Jul. 15, 2016.

(Continued)

*Primary Examiner* — Corey S Faherty
(74) *Attorney, Agent, or Firm* — Peter K. Suchecki

(57) ABSTRACT

A processor includes a performance monitor that logs reservation losses, and additionally logs reasons for the reservation losses. By logging reasons for the reservation losses, the performance monitor provides data that can be used to determine whether the reservation losses were due to valid programming, such as two threads competing for the same lock, or whether the reservation losses were due to bad programming. When the reservation losses are due to bad programming, the information can be used to improve the programming to obtain better performance.

17 Claims, 10 Drawing Sheets

(56) References Cited

U.S. PATENT DOCUMENTS

| | | |
|---|---|---|
| 2014/0040551 A1 | 2/2014 | Blainey et al. |
| 2015/0161052 A1 | 6/2015 | Ghai et al. |
| 2015/0242327 A1 | 8/2015 | Guthrie et al. |
| 2016/0011996 A1 | 1/2016 | Asaad et al. |

OTHER PUBLICATIONS

Appendix P'List of IBM Patents or Patent Applications Treated as Related, dated Feb. 5, 2020.
Ppc64 POWER8 processor events, printed from http://oprofile.sourceforge.net/docs/ppc64-power8-events.php on Jul. 5, 2016.
Shriraman et al.; Refereeing Conflicts in Hardware Transactional Memory; Jun. 2009; ACM.

```
# Assume that GPR 4 contains the new value to be stored.
# Assume that GPR 3 contains the address of the word
# to be loaded and replaced.

loop: lwarx r5,0,r3    # Load and reserve
stwcx. r4,0,r3         # Store new value if still reserved
bne- loop              # Loop if lost reservation

# The new value is now in storage.
```

FIG. 2

```
# Assume that GPR 5 contains the new value to be stored after
# a successful match.
# Assume that GPR 3 contains the address of the word to be
# tested.
# Assume that GPR 4 contains the value to be compared against
# the value in memory.

loop: lwarx r6,0,r3    # Load and reserve
cmpw r4,r6             # Are the first two operands equal?
bne- exit              # Skip if not equal
stwcx. r5,0,r3         # Store new value if still reserved
bne- loop              # Loop if lost reservation
exit: mr r4,r6         # Return value from storage

# The old value is returned to GPR 4.
# If a match was made, storage contains the new value.
```

FIG. 3

| | Reservation Loss Reasons |
|---|---|
| 1 | Store by Same Thread on Same Cache Line |
| 2 | Same Thread Competing for the Same Lock |
| 3 | Store by Another Thread on Same Cache Line |
| 4 | Reservation Unsuccessful by This Thread for This Cache Line |
| 5 | Another Thread Competing for the Same Lock |

PROCESSOR PERFORMANCE MONITOR THAT LOGS REASONS FOR RESERVATION LOSS

BACKGROUND

1. Technical Field

This disclosure generally relates to processors, and more specifically relates to performance monitors in processors.

2. Background Art

Modern processors are extremely complex devices that include multiple processor cores, multiple levels of cache, multiple instruction pipelines, and many other features. To gain insight into what is happening on-chip on the processor, performance monitors have been developed that log many different pieces and types of data that collectively indicate many aspects of the detailed inner workings of the processor that can affect the processor's performance. As an example, the processor can be run for some period of time, then stopped, at which point the on-chip performance monitor can be queried to determine how the processor performed. Events like cache misses, stalls in various components in the processor, idle and busy indications for various components in the processor, and many others, can all be tracked by an on-chip performance monitor. This information from an on-chip performance monitor can be very valuable in assessing many aspects of system design, including performance of the processor in executing particular software.

The PowerPC processor architecture includes two special instructions that, when used together, emulate a read-modify-write operation on a specified memory location. The larx (Load and Reserve Indexed) instruction is used to get a reservation on a specified memory location. The stcx (Store Conditional Indexed) instruction is used after the larx instruction to ensure that no other processor or mechanism has modified the specified memory location between the time the larx instruction is executed and the time the stcx instruction completes.

Different threads in a processor can share memory. The use of the larx and stcx instructions ensures different threads can access the same memory without fear of corrupting the data in the memory location. When two threads compete for the same lock, the larx and stcx instructions assure only one thread at a time can modify the memory location.

The performance monitor on PowerPC processors tracks the number of times a reservation by a larx instruction is lost before the stcx instruction completes. However, bad programming can cause an excessive number of reservation losses, which can significantly impact performance of the processor.

BRIEF SUMMARY

A processor includes a performance monitor that logs reservation losses, and additionally logs reasons for the reservation losses. By logging reasons for the reservation losses, the performance monitor provides data that can be used to determine whether the reservation losses were due to valid programming, such as two threads competing for the same lock, or whether the reservation losses were due to bad programming. When the reservation losses are due to bad programming, the information can be used to improve the programming to obtain better performance.

The disclosure herein supports an integrated circuit processor comprising a performance monitor that detects and logs a plurality of reservation losses in the processor and additionally determines and logs a reason for at least one of the plurality of reservation losses. By determining and logging a reason for a reservation loss, data from the performance monitor can be used to determine whether reservation losses are due to bad programming or due to valid programming.

The disclosure herein further supports that a reservation loss occurs between a first instruction that gains a reservation on a specified memory address and a second instruction that completes operations on the specified memory address. An example of the first instruction is a larx instruction and an example of the second instruction is an stcx instruction, both of which are defined in the PowerPC instruction set.

The disclosure herein also supports a method for logging reservation losses in an integrated circuit processor, the method comprising: detecting a plurality of reservation losses in the processor; determining a reason for at least one of the plurality of reservation losses; logging the plurality of reservation losses; and logging the reason for the at least one of the plurality of reservation losses. By determining and logging a reason for a reservation loss, the logged reasons can be used to determine whether reservation losses are due to bad programming or due to valid programming.

The disclosure herein further supports an integrated circuit processor comprising: a cache memory that includes a plurality of cache lines, wherein a reservation for a specified memory address comprises a reservation for a cache line that includes the specified memory address; a performance monitor that logs a plurality of reservation losses in the processor and additionally logs a reason for at least one of the plurality of reservation losses, wherein a reservation loss occurs between a first instruction that gains a reservation on a specified memory address and a second instruction that completes operations on the specified memory address, wherein the first instruction comprises a Load and Reserve Indexed (larx) instruction and the second instruction comprises a Store Conditional Indexed (stcx) instruction defined in an instruction set for a PowerPC processor, wherein the reservation for the cache line is lost when a store is made to a second memory address in the cache line after the first instruction is executed by the processor and before the second instruction is executed by the processor; and a load/store unit that indicates to the performance monitor when a reservation loss is due to a store to the cache line that includes the specified memory address. By determining and logging a reason for a reservation loss, data from the performance monitor can be used to determine whether reservation losses are due to bad programming or due to valid programming.

The disclosure herein additionally supports a method for logging reservation losses in an integrated circuit processor, the method comprising: detecting a plurality of reservation losses in the processor, wherein a reservation loss occurs between a first instruction that gains a reservation on a specified memory address and a second instruction that completes operations on the specified memory address, wherein the first instruction comprises a Load and Reserve Indexed (larx) instruction and the second instruction comprises a Store Conditional Indexed (stcx) instruction defined in an instruction set for a PowerPC processor, wherein a reservation for the specified memory address comprises a reservation for a cache line that includes the specified memory address, wherein the reservation for the cache line is lost when a store is made to a second memory address in the cache line after the first instruction is executed by the processor and before the second instruction is executed by the processor; determining from a load/store unit in the processor a reason for at least one of the plurality of reservation losses; logging the plurality of reservation losses; sampling addresses that have one of the plurality of reservation losses; and logging the reason for the reservation loss at each sampled address. By determining and logging a reason for a reservation loss, data from the performance monitor can be used to determine whether reservation losses are due to bad programming or due to valid programming.

The disclosure herein further supports a method for identifying bad programming in a computer program, the method comprising: while executing the computer program, an integrated circuit processor performing the steps of: detecting a plurality of reservation losses in the processor, wherein a reservation loss occurs between a first instruction that gains a reservation on a specified memory address and a second instruction that completes operations on the specified memory address, wherein the first instruction comprises a Load and Reserve Indexed (larx) instruction and the second instruction comprises a Store Conditional Indexed (stcx) instruction defined in an instruction set for a PowerPC processor, wherein a reservation for the specified memory address comprises a reservation for a cache line that includes the specified memory address, wherein the reservation for the cache line is lost when a store is made to a second memory address in the cache line after the first instruction is executed by the processor and before the second instruction is executed by the processor; determining from a load/store unit in the processor a reason for at least one of the plurality of reservation losses; logging the plurality of reservation losses; sampling addresses that have one of the plurality of reservation losses; and logging the reason for the reservation loss at each sampled address; stopping execution of the computer program; querying the logged plurality of reservation losses and the logged reasons for the reservation loss at each sampled address; and identifying from the logged reasons for the reservation loss at each sampled address the bad programming in the computer program. By determining and logging a reason for a reservation loss, bad programming can be more easily identified.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a first snippet of pseudo-code that illustrates use of lwarx and stwcx instructions, which are versions of the larx and stcx instructions for words;

FIG. 3 is a second snippet of pseudo-code that illustrates use of the lwarx and stwcx instructions;

DETAILED DESCRIPTION

The disclosure and claims herein are directed to a processor that includes a performance monitor that logs reservation losses, and additionally logs reasons for the reservation losses. By logging reasons for the reservation losses, the performance monitor provides data that can be used to determine whether the reservation losses were due to valid programming, such as two threads competing for the same lock, or whether the reservation losses were due to bad programming. When the reservation losses are due to bad programming, the information can be used to improve the programming to obtain better performance.

Figure 1:
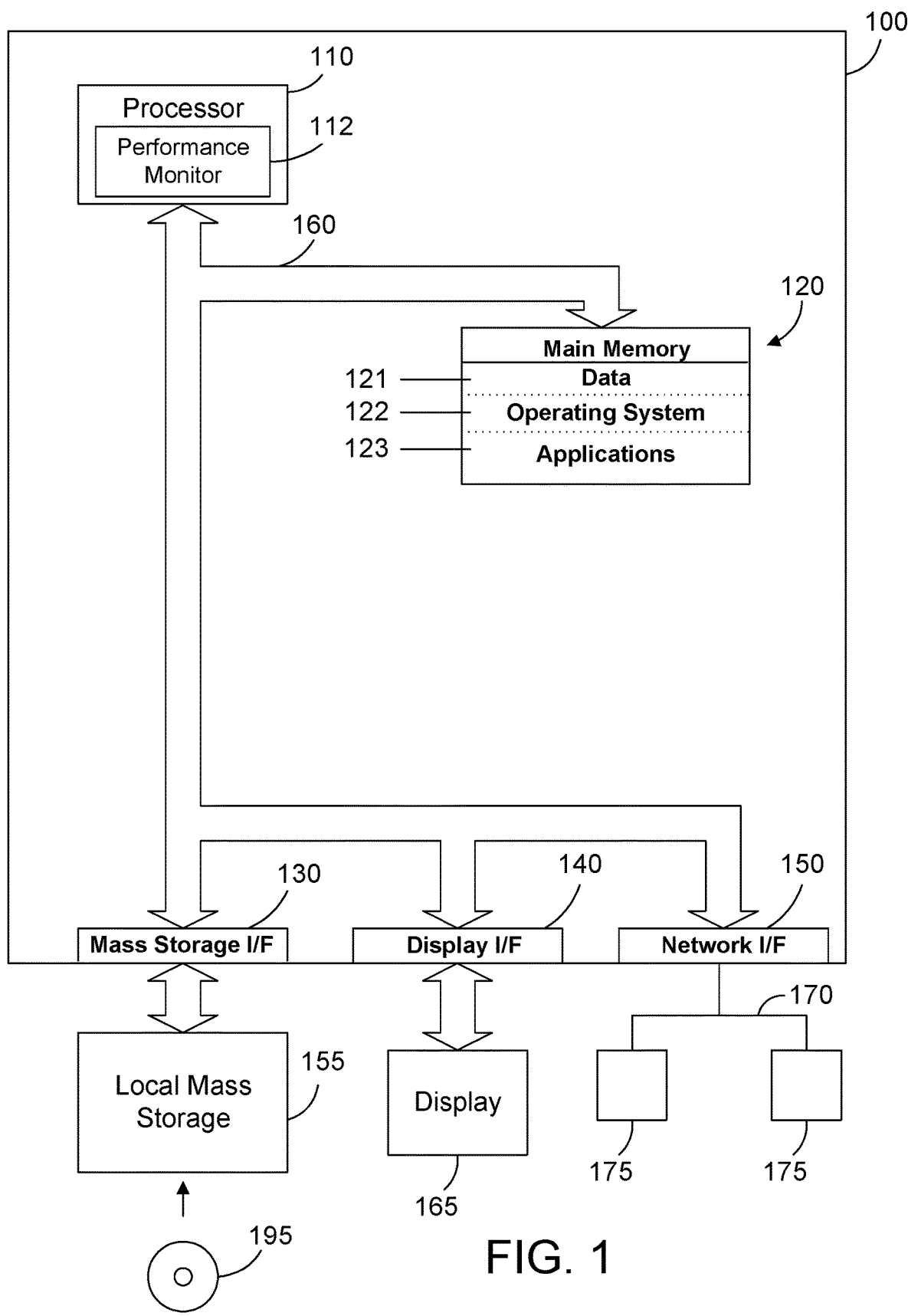
FIG. 1 is a block diagram of a computer system that includes a processor with a performance monitor that tracks reservation losses and reasons for the reservation losses.

Referring to FIG. 1, a computer system 100 is one suitable implementation of a computer system that includes a performance monitor 112 as described in more detail below. Server computer system 100 is an IBM POWER computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such a thumb drive.

Main memory 120 preferably contains data 121, an operating system 122, and one or more software applications 123. Data 121 represents any data that serves as input to or output from any program in computer system 100. Operating system 122 is a multitasking operating system, such as AIX or LINUX. Applications 123 represent programs that can be run by the computer system 100.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and applications 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 is most preferably a multi-core processor in the POWER family of processors that supports larx and stcx instructions. Processor 110 includes a performance monitor 112, described in more detail below. Processor 110 executes program instructions stored in main memory 120. Main memory 120 stores programs and data that processor 110 may access. When computer system 100 starts up, processor 110 initially executes the program instructions that make up operating system 122. Processor 110 also executes the applications 123 under control of the operating system 122.

Although computer system 100 is shown to contain only a single processor and a single system bus, those skilled in the art will appreciate the performance monitor as described herein may be practiced using a computer system that has multiple processors with their respective performance monitors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

As discussed in the Background section above, the PowerPC processor architecture includes two special instructions that, when used together, emulate a read-modify-write operation on a specified memory location. The larx (Load and Reserve Indexed) instruction is used to get a reservation on a specified memory location. The stcx (Store Conditional Indexed) instruction is used after the larx instruction to ensure that no other processor or mechanism has modified the specified memory location between the time the larx instruction is executed and the time the stcx instruction completes.

Different threads in a processor can share memory. The use of the larx and stcx instructions ensures different threads can access the same memory without fear of corrupting the data in the memory location. When two threads compete for the same lock, the larx and stcx instructions assure only one thread at a time can modify the memory location.

Referring to FIG. 2, a snippet of pseudo-code is shown that illustrates how the lwarx and stwcx instructions in the PowerPC instruction set are used to emulate a read-modify-write operation to a specified memory location. Note the lwarx and stwcx instructions are examples of the larx and stcx instructions discussed herein for loading and storing words. There are other versions of larx and stcx instructions for other size data operations, such as lbarx and stbcx for bytes, etc. The lwarx instruction in FIG. 2 reserves register r3. When the stwcx instruction is executed, if the reservation created by the lwarx instruction has not been lost, the stwcx instruction stores the new value to register r3. If the reservation created by the lwarx instruction was lost before the stwcx instruction completes, the code loops back to the lwarx instruction to try again. This code snippet illustrates that many programmers choose to loop to retry when a reservation is lost. This works well when two threads are competing to reserve the same memory location, because the time between when one thread loses its reservation and the other thread completes will be relatively small. As a result, looping to re-try as shown in FIG. 2 is a suitable way to code using the lwarx/stwcx instructions. Note the term "memory location" as used herein refers to any suitable memory location, including processor registers and addresses in other types of memory.

FIG. 3 shows another snippet of pseudo-code that provides a second example of how the lwarx/stwcx instructions are used. In this example there is a compare instruction between the lwarx and stwcx instructions. But if the reservation is lost, the code still loops back to try again. The code snippets in FIGS. 2 and 3 both illustrate common programming practice, to loop back and try again when a reservation is lost. Because looping to retry is the common way for using larx/stcx instructions, if a reservation is lost due to bad programming, the performance of the computer program can be negatively affected due to the reservation losses because the looping code is continually trying to get the reservation over and over again until it succeeds.

The performance monitor on Power7 and Power8 processors tracks the number of times a reservation by a larx instruction is lost before the stcx instruction completes. However, bad programming can cause an excessive number of reservation losses, which can significantly impact performance of the processor in executing the code with the bad programming. In the Power family of processors, a reservation is not for a single memory location. Due to hardware constraints in the processor, a reservation is made for a cache line that includes the specified memory location. This means a store to any memory location in the cache line can cause a reservation to be lost. PowerPC documentation warns programmers not to program in a way that will cause a store to a cache line that could be reserved from a previous larx instruction. This is one example of bad programming as discussed herein. If programmers do not heed this warning, the result could be code that suffers performance penalties due to the bad programming which allows a store to the same cache line that has been reserved by a larx instruction, thereby causing the reservation to be lost.

Because existing performance monitors in Power7 and Power8 processors track the number of times a reservation by a larx instruction is lost, this gives valuable information. However, the problem with only logging a number of times a reservation is lost is the number gives no information regarding whether any reservation was lost due to poor programming or due to valid programming. The solution to this problem is the performance monitor disclosed and claimed herein, which logs not only the number of times a reservation is lost, but additionally logs a reason that one or more of the logged reservations were lost. The logged reasons for reservation losses allows determining whether the logged reservation losses were primarily due to bad programming or primarily due to valid programming. For reservation losses due to bad programming, the performance monitor can supply important information to help identify the bad programming in the code.

Figures 4, 5:
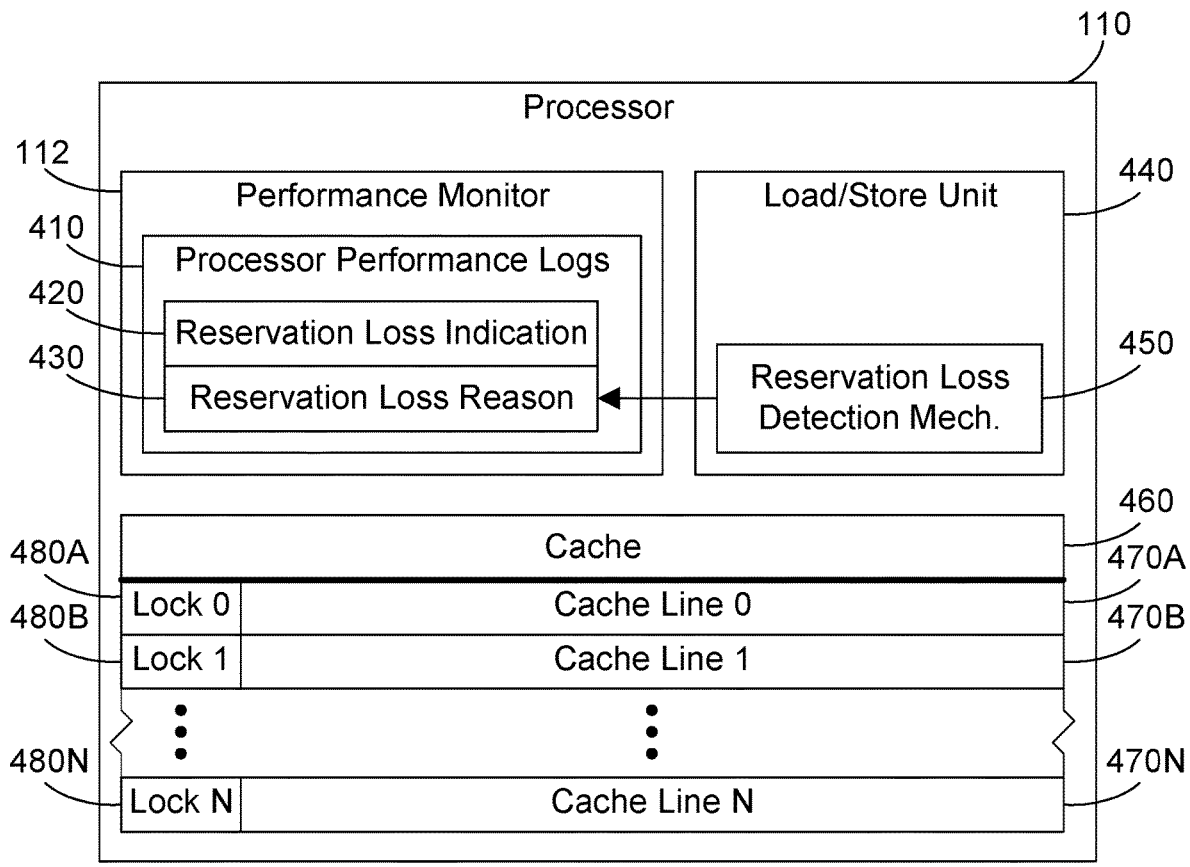
FIG. 4 is a block diagram showing some of the features of the processor 110 shown in FIG. 1.
FIG. 5 is a table showing specific reasons for reservation losses.

FIG. 4 shows additional details for processor 110 shown in FIG. 1. Note that processor 110 includes many features and functions not shown in FIG. 4 or described herein, as understood by one skilled in the art. Processor 110 includes a performance monitor 112, a load/store unit 440, and a cache 460. The performance monitor 112 logs information to processor performance logs 410. The performance monitor in known Power7 and Power8 processors logs many different types of data from many different functional blocks on the processor that provide indications of the internal workings of the processor as the processor runs that are not shown in FIG. 4 or discussed herein. One piece of data collected in current Power7 and Power8 processors is reservation loss information, which is stored in a counter that counts the number of reservation losses. But logging the raw number of reservation losses gives no indication about what caused the reservation losses, whether it was valid programming or bad programming. The performance monitor disclosed and claimed herein provides a significant advantage over known performance monitors by logging in the processor performance logs 410 not only a reservation loss indication 420, but a reservation loss reason 430 as well. Note there need not be a one-to-one correspondence between reservation loss indication 420 and reservation loss reason 430. Rather than logging a reason for each reservation loss, the performance monitor 112 could sample addresses where reservation losses occur, and provide a reason for the reservation loss at the sampled address.

The reservation loss reason 430 can be supplied by a reservation loss detection mechanism 450 in the load/store unit 440. When a reservation loss occurs, the load/store unit 440 indicates to the performance monitor 112 the reason 430 for the reservation loss. This reservation loss reason 430 can be saved for each address sampled by the performance monitor 112 where a reservation loss occurred.

The cache 460 includes a number of cache lines 470, shown in FIG. 4 as 470A, 470B, . . . 470N. Each cache line includes multiple addresses. For Power8 processors, each cache line contains 128 bytes. Each cache line has a corresponding lock 480, shown in FIG. 4 as lock 480A, lock 480B, . . . , lock 480N. Each lock is preferably a single bit, with one value (e.g., a 1) indicating the cache line is reserved (or locked) and the opposite value (e.g., a 0) indicating the cache line is not reserved (or locked). When a larx instruction is executed, if the memory location specified in the larx instruction is not currently in the cache 460, a cache line that includes the specified memory location is loaded into the cache 460, and the corresponding lock bit 480 is set. Of course, if the specified memory location is already in the cache 460, the lock for the corresponding cache line can be obtained without loading a cache line into the cache. Let's assume for this example the specified memory location in the larx instruction is located in cache line 1 470B, which causes the corresponding lock bit 480B to be set. If the reservation is lost before the stcx instruction completes its processing, the lock bit 480B is cleared, which indicates to the stcx instruction the reservation was lost and the larx/stcx instructions need to be executed again, as illustrated in the code snippets in FIGS. 2 and 3.

There are multiple reasons a reservation can be lost. FIG. 5 shows a table of reasons, by way of example. Other reasons could exist that are not shown in FIG. 5 or that are developed in the future. If a reservation is obtained by an larx instruction, a store by the same thread to a memory location on the same cache line will cause the reservation to be lost, as shown by reason 1 in FIG. 5. If a reservation is obtained by an larx instruction, the same thread competing for the same lock will cause the reservation to be lost, as shown by reason 2 in FIG. 5. If a reservation is obtained by an larx instruction, a store by another thread to a memory location on the same cache line will cause the reservation to be lost, as shown by reason 3 in FIG. 5. If a reservation is obtained by an larx instruction, and the reservation is unsuccessful by this thread for this cache line, this will cause the reservation to be lost, as shown by reason 4 in FIG. 5. If a reservation is obtained by an larx instruction, another thread competing for the same lock will cause the reservation to be lost, as shown by reason 5 in FIG. 5. Of the five reasons listed in FIG. 5, note the first four are caused by bad programming, while the last one, reason 5, is the only valid reason for losing a reservation. Bad programming can thus constitute a majority of reservation losses in a processor. By logging not only a number of reservation losses but additionally logging a reason for one or more of those reservation losses, an analyst can determine when there are excessive reservation losses caused by bad programming, which can help pinpoint addresses where reservation losses occurred and thus aid in debugging the code so the bad programming is identified and can be eliminated.

Figure 6:
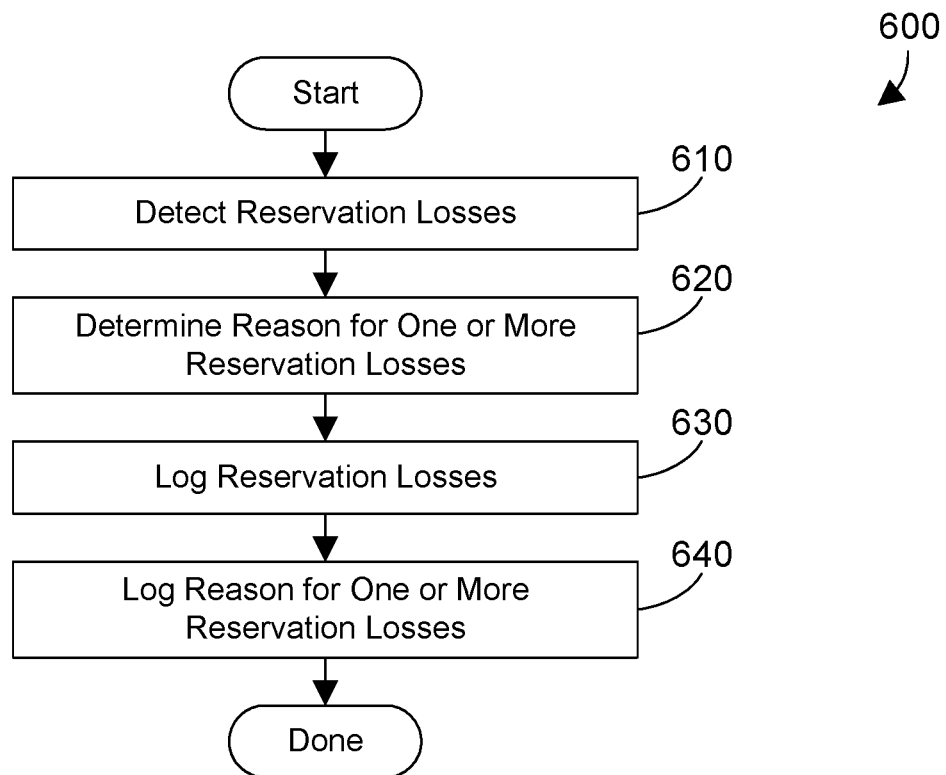
FIG. 6 is a flow diagram of a method for logging reservation losses and logging a reason for one or more reservation losses.

Referring to FIG. 6, a method 600 is preferably performed by the performance monitor 112 in processor 110, shown in FIGS. 1 and 4. Reservation losses are detected (step 610). A reason for one or more of the reservation losses is determined (step 620). The reservation losses are then logged (step 630), and the reasons for one or more of the reservation losses are also logged (step 640). This logged information allows determining when reservation losses are caused by bad programming.

Figure 7:
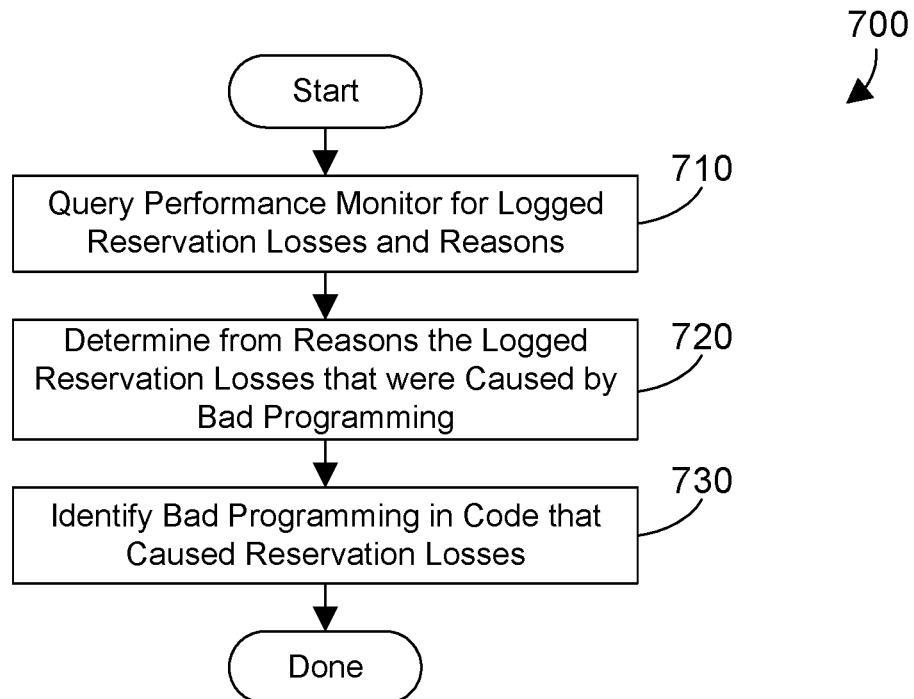
FIG. 7 is a flow diagram of a method for identifying bad programming in code by determining reservation losses and reasons from the performance monitor.

Referring to FIG. 7, a method 700 is performed to identify bad programming in code. We assume the code is executed by the processor, and the processor is then halted. The performance monitor can be queried for the logged reservation losses and reasons (step 710). The reasons can then be used to determine which logged reservation losses were caused by bad programming (step 720). The reasons can help identify bad programming in the code that caused the reservation losses (step 730). The performance monitor can thus provide important information that allows more effectively debugging code that includes bad programming that causes reservation losses.

Figures 8, 9:
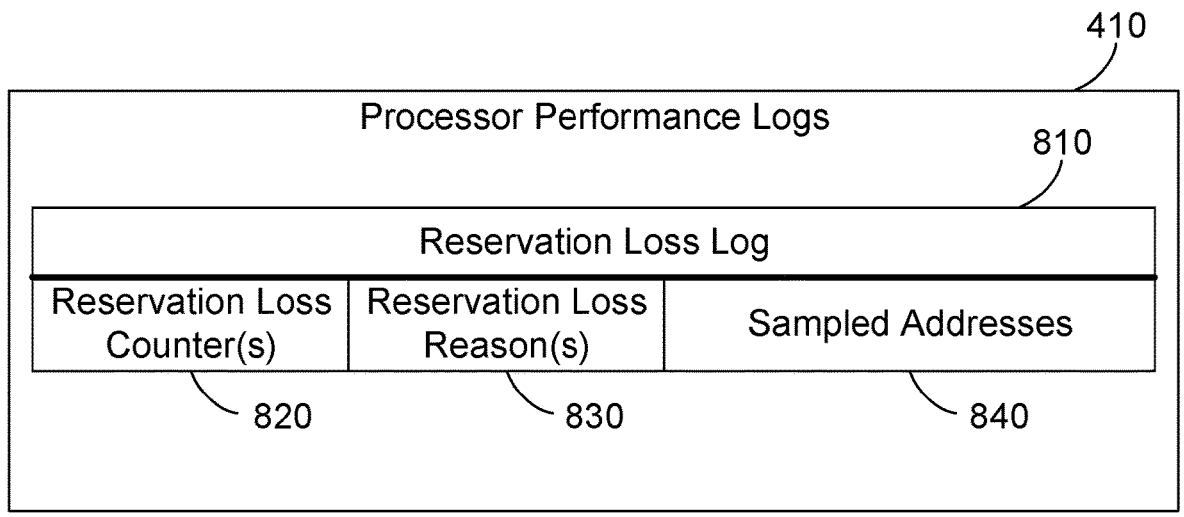
FIG. 8 shows a general implementation for a reservation loss log in a processor performance monitor.
FIG. 9 is a block diagram showing a first specific implementation for the reservation loss log shown in FIG. 8.

One of the processor performance logs 410 in FIG. 4 could include a reservation loss log 810 as shown in FIG. 8, which includes one or more reservation loss counters 820, one or more reservation loss reasons 830, and one or more sampled addresses 840. The disclosure and claims herein extend to any suitable implementation for the reservation loss log 810. Three specific implementations are shown herein as examples of different ways to implement the reservation loss log 810. Of course, other ways not shown herein are within the scope of the disclosure and claims.

A first specific implementation for the reservation loss log 810 in FIG. 8 is shown at 900 in FIG. 9. The reservation loss log 900 includes a reservation loss counter 910 that is incremented each time a reservation loss occurs, regardless of whether the reservation loss was due to bad programming or valid programming. The performance monitor samples addresses where reservation losses occurred, and logs those as sampled addresses 920 shown in FIG. 9. In this implementation, a single bit called a reason bit 930 is associated with each sampled address 920 where a reservation loss occurred. In this specific implementation, the reason bit is set to a 0 if the sampled address had a reservation loss due to bad programming, and is set to a 1 if the sample address had a reservation loss due to valid programming. Providing a single reservation loss counter 910 with a single bit that indicates whether each sampled address had a reservation loss due to bad programming or valid programming is an efficient way to convey the reservation loss reasons for those sampled addresses with very little additional hardware in the processor.

Figure 10:
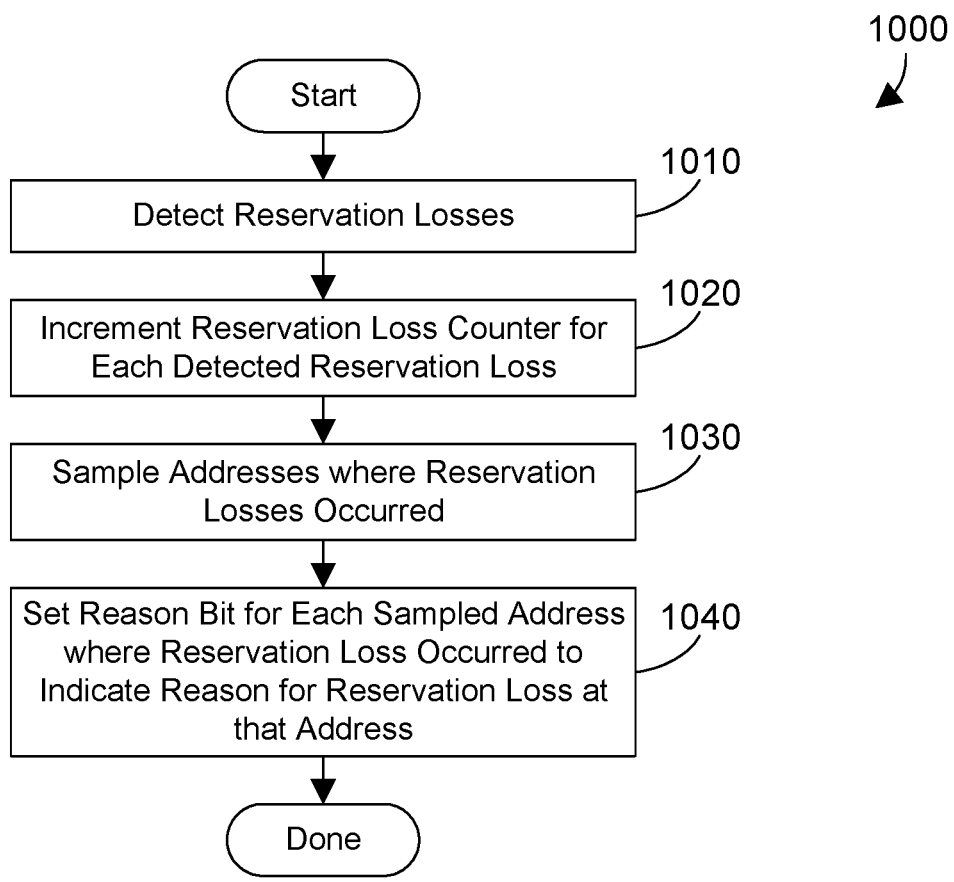
FIG. 10 is a flow diagram of a method that uses the first specific implementation for the reservation loss log shown in FIG. 9.

Referring to FIG. 10, a method 1000 is preferably performed by the performance monitor when the performance monitor has implemented the reservation loss log 900 shown in FIG. 9. Reservation losses are detected (step 1010). The reservation loss counter 910 is incremented for each detected reservation loss (step 1020). Addresses where reservation losses occurred are sampled by the performance monitor (step 1030) and logged as sampled addresses 920. The reason bit 930 for each sampled address is set to indicate the reason for the reservation loss at that address (step 1040), which indicates whether the reason for the reservation loss was bad programming or valid programming. Method 1000 is then done.

Figure 11:
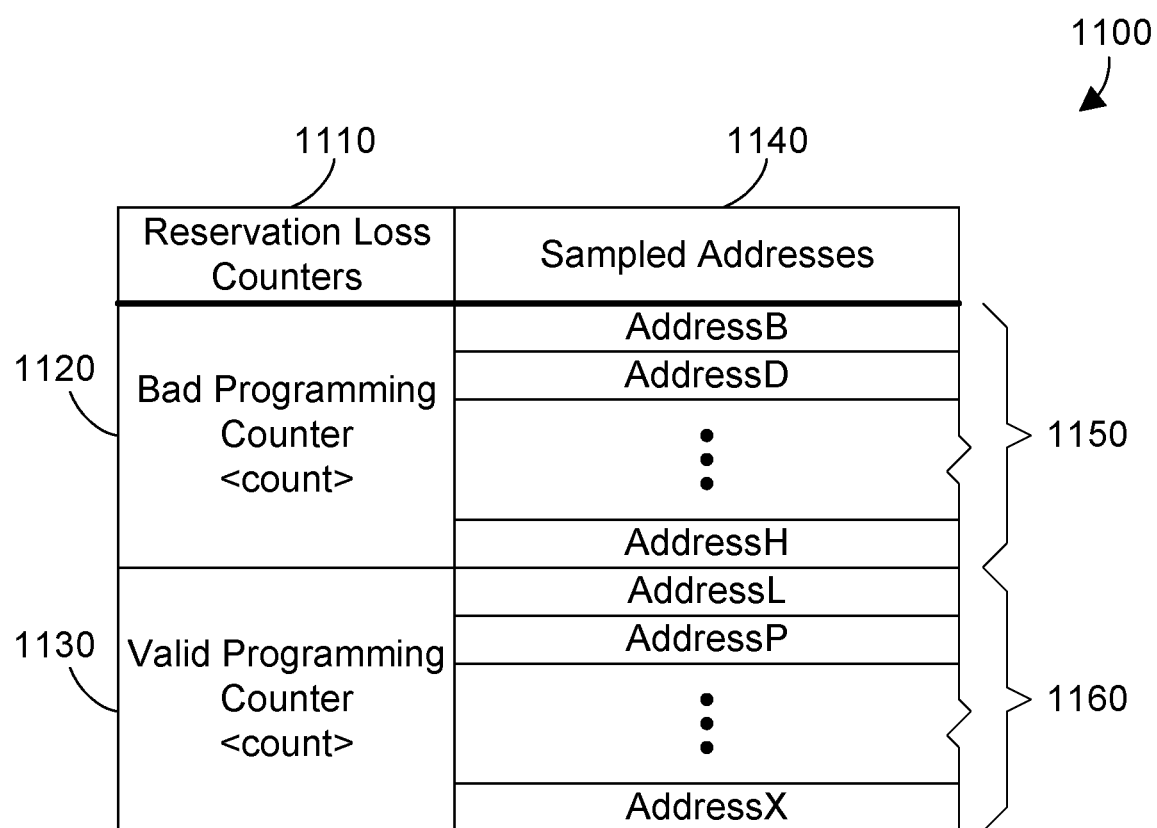
FIG. 11 is a block diagram showing a second specific implementation for the reservation loss log shown in FIG. 8.

A second specific implementation for the reservation loss log 810 in FIG. 8 is shown at 1100 in FIG. 11. In this implementation, there are two reservation loss counters 1110, including a bad programming counter 1120 and a valid programming counter 1130. When a reservation loss occurs, the performance monitor determines a reason for the reservation loss. When the reason is bad programming, the bad programming counter 1120 is incremented. When the reason is valid programming, the valid programming counter 1130 is incremented. The performance monitor also samples addresses where reservation losses occurred, and logs those as sampled addresses 1140. Note, however, the sampled addresses 1140 are separated into two groups 1150 and 1160, with the first group 1150 corresponding to addresses where the reservation was lost due to bad programming, and the second group 1160 corresponding to addresses where the reservation was lost due to valid programming. The second implementation shown in FIG. 11 only adds one additional counter when compared to the known performance monitors that only have a single counter for logging all reservation losses, and is thus an efficient way to convey the reservation loss reasons for the sampled addresses with very little additional hardware in the processor.

Figure 12:
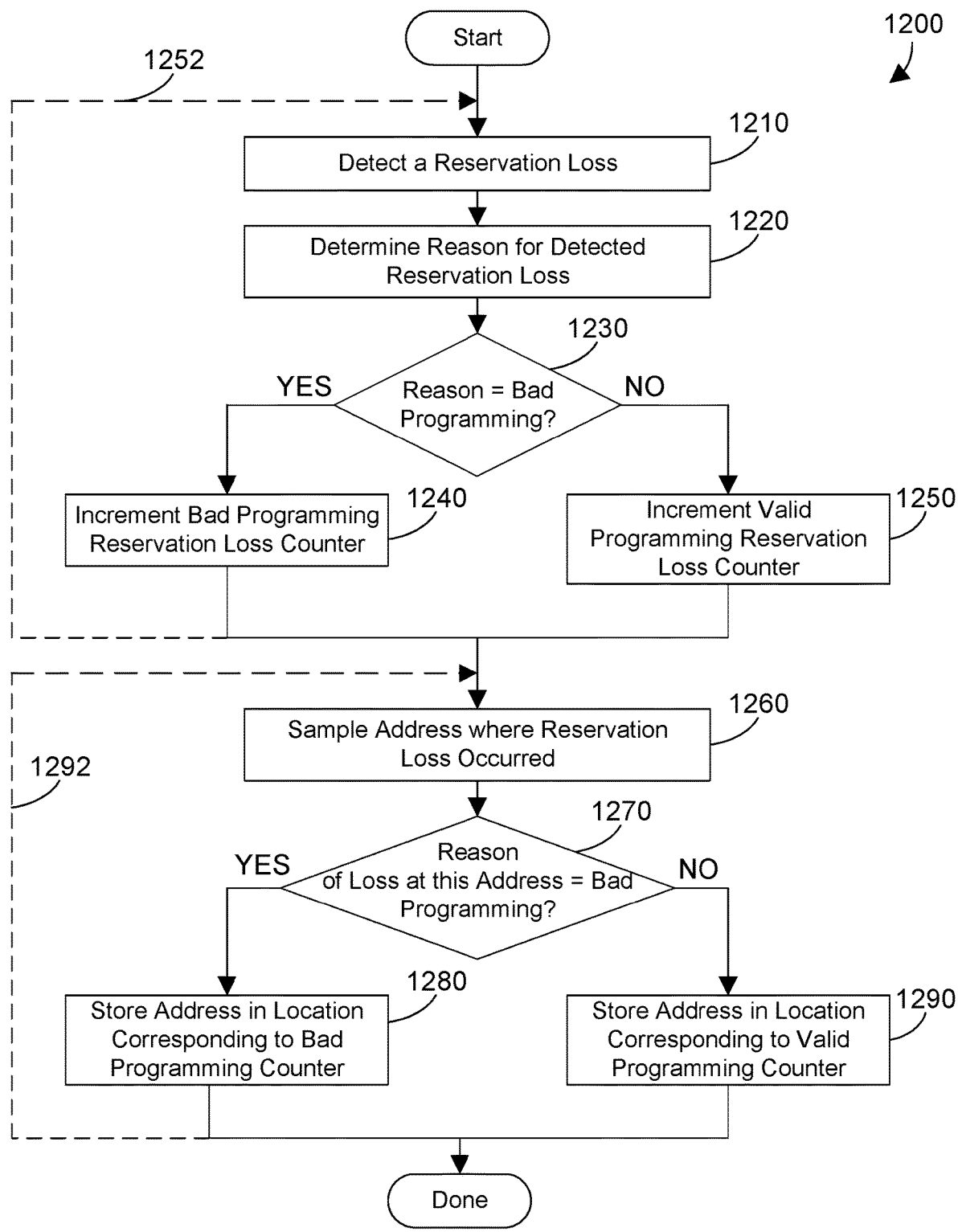
FIG. 12 is a flow diagram of a method that uses the second specific implementation for the reservation loss log shown in FIG. 11.

Referring to FIG. 12, a method 1200 is preferably performed by the performance monitor when the performance monitor has implemented the reservation loss log 1100 shown in FIG. 11. A reservation loss is detected (step 1210). The cause of the reservation loss is determined (step 1220). This can be done, for example, by looking at the information that the reservation loss detection 450 in the load/store unit 440 in FIG. 4 sends to the performance monitor 112. When the reason for the reservation loss is bad programming (step 1230=YES), the bad programming reservation loss counter 1120 is incremented (step 1240). When the reason for the reservation loss is valid programming (step 1230=NO), the valid programming reservation loss counter 1130 is incremented (step 1250). Note that steps 1210 through 1240 or 1250 are repeated for each detected reservation loss, as indicated by the dotted line 1252. The performance monitor can periodically sample an address where a reservation loss occurred (step 1260). When the reason for the reservation loss at the sampled address is bad programming (step 1270=YES), the address is stored in a location 1150 corresponding to the bad programming counter. When the reason for the reservation loss at the sampled address is valid programming (step 1270=NO), the address is stored in a location 1160 corresponding to the valid programing counter (step 1290). Note the sampling of addresses and storing each address to the proper location in steps 1260 through 1280 or 1290 is repeated for each sampled address, as shown by the dotted line 1292.

Figure 13:
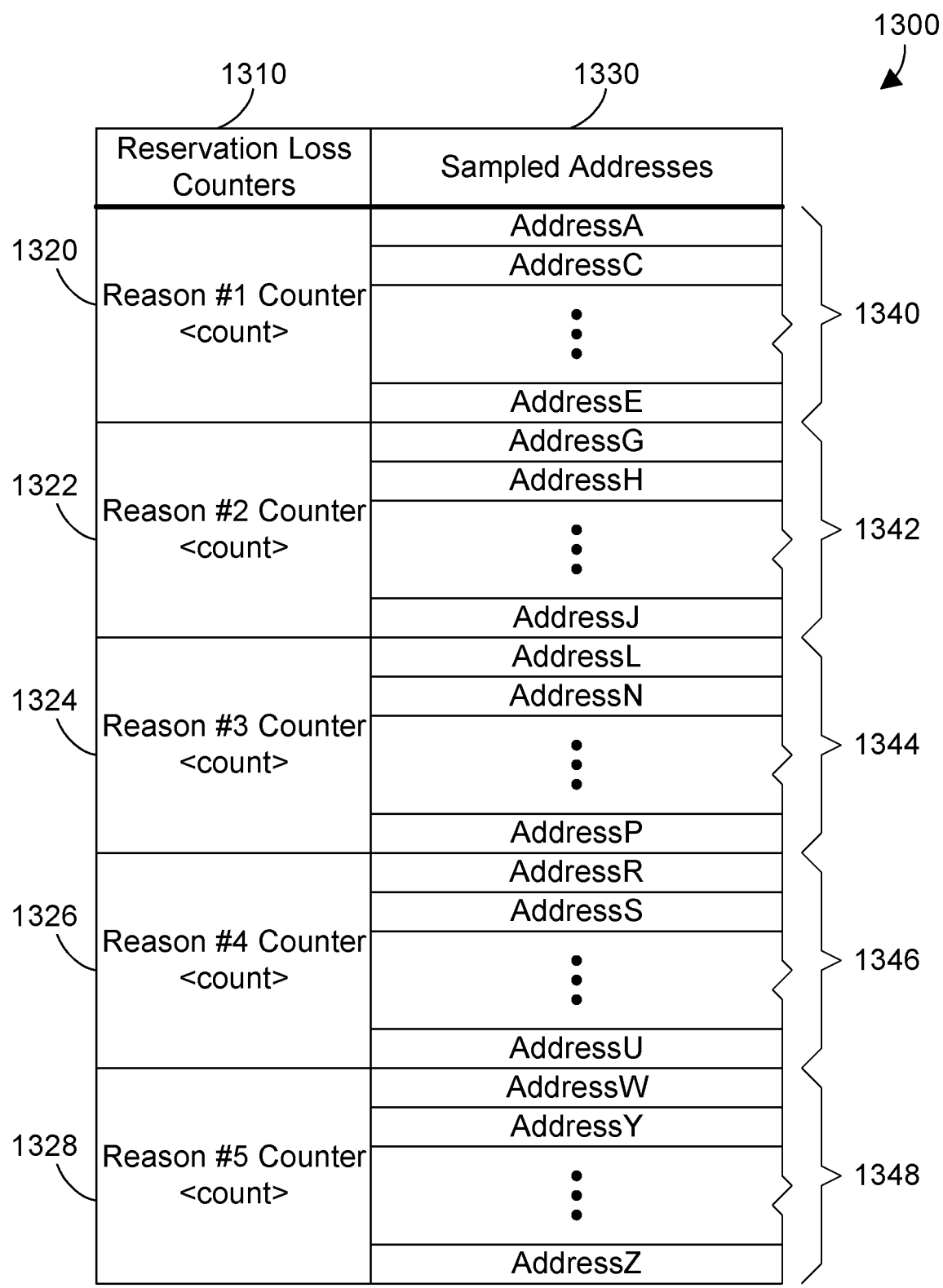
FIG. 13 is a block diagram showing a third specific implementation for the reservation loss log shown in FIG. 8.

A third specific implementation for the reservation loss log 810 in FIG. 8 is shown at 1300 in FIG. 13. In this implementation, there are five reservation loss counters 1310, including a reason #1 counter 1320, a reason #2 counter 1322, a reason #3 counter 1324, a reason #4 counter 1326, and a reason #5 counter 1328. For this specific implementation, the reasons 1-5 in FIG. 13 correspond to the reasons 1-5 shown in the table in FIG. 5. When a reservation loss occurs, the performance monitor determines a reason for the reservation loss. When the reason is reason #1, the reason #1 counter 1320 is incremented. When the reason is reason #2, the reason #2 counter 1322 is incremented. When the reason is reason #3, the reason #3 counter 1324 is incremented. When the reason is reason #4, the reason #4 counter 1326 is incremented. When the reason is reason #5, the reason #5 counter 1328 is incremented. The performance monitor also samples addresses where reservation losses occurred, and logs those as sampled addresses 1330. The sampled addresses 1330 are separated into five groups 1340, 1342, 1344, 1346 and 1348. The first group 1340 corresponds to addresses where the reservation was lost due to reason #1. The second group 1342 corresponds to addresses where the reservation was lost due to reason #2. The third group 1344 corresponds to addresses where the reservation was lost due to reason #3. The fourth group 1346 corresponds to addresses where the reservation was lost due to reason #4. The fifth group 1348 corresponds to addresses where the reservation was lost due to reason #5. The third implementation shown in FIG. 13 adds four additional counters when compared to the known performance monitors that only have a single counter for logging all reservation losses. While the addition of four counters is more expensive in hardware than the previous two implementations, the additional hardware provides finer granularity of information from the performance monitor that would more effectively help in debugging bad programming in code.

Figure 14:
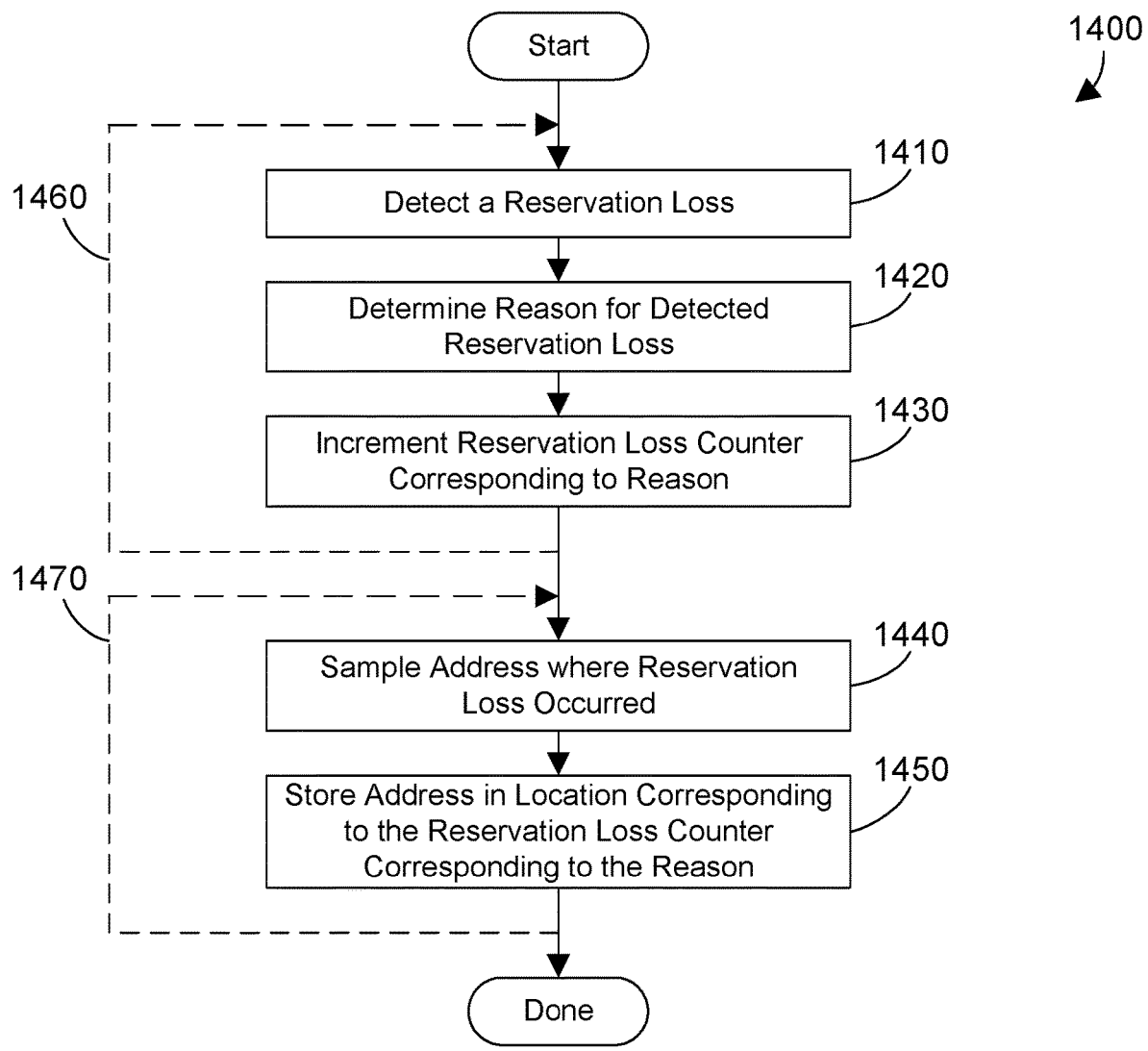
FIG. 14 is a flow diagram of a method that uses the third specific implementation for the reservation loss log shown in FIG. 13.

Referring to FIG. 14, a method 1400 is preferably performed by the performance monitor when the performance monitor has implemented the reservation loss log 1300 shown in FIG. 13. A reservation loss is detected (step 1410). A reason for the detected reservation loss is determined (step 1420). This can be done, for example, by looking at the information that the reservation loss detection 450 in the load/store unit 440 in FIG. 4 sends to the performance monitor 112. The reservation loss counter corresponding to the reason (one of 1320, 1322, 1324, 1326 and 1328) is incremented (step 1430). Note that steps 1410 through 1430 will be repeated for each reservation loss, as shown by the dotted line 1460. An address where a reservation loss occurred is sampled by the performance monitor (step 1440) and logged as a sampled address 1330. The address is stored in the location (one of 1340, 1342, 1344, 1346 and 1348) corresponding to the reservation loss counter corresponding to the reason for the reservation loss (step 1450). Note the sampling of addresses and storing the address to the proper location in steps 1440 and 1450 is repeated for each sampled address, as shown by the dotted line 1470.

The performance monitor described herein provides a significant advantage over known performance monitors by not only logging a count of reservation losses, but also logging a reason for one or more of those reservation losses. Because reservation losses can be caused by bad programming, logging a reason for reservation losses allows identifying addresses in the code that are causing reservation losses due to bad programming, thereby helping to debug the bad programming in the code.

A processor includes a performance monitor that logs reservation losses, and additionally logs reasons for the reservation losses. By logging reasons for the reservation losses, the performance monitor provides data that can be used to determine whether the reservation losses were due to valid programming, such as two threads competing for the same lock, or whether the reservation losses were due to bad programming. When the reservation losses are due to bad programming, the information can be used to improve the programming to obtain better performance.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples presented herein refer to sampling of addresses that have a reservation loss, the disclosure and claims herein also extend to logging a reason for each address where a reservation loss occurs. In addition, while five reasons for reservation losses are described herein, other reasons for reservation losses could arise in the future, which are within the scope of the disclosure and claims herein.

The invention claimed is:

1. An integrated circuit processor comprising:
a performance monitor that detects and logs a plurality of reservation losses in the processor and additionally determines and logs a reason for at least one of the plurality of reservation losses, wherein the performance monitor comprises a plurality of reservation loss counters, wherein a first of the plurality of reservation loss counters is incremented when a selected reservation loss is due to bad programming and a second of the plurality of reservation loss counters is incremented when the selected reservation loss is due to valid programming.

2. The processor of claim 1 wherein a reservation loss occurs between a first instruction that gains a reservation on a specified memory address and a second instruction that completes operations on the specified memory address.

3. The processor of claim 2 wherein the first instruction comprises a Load and Reserve Indexed (larx) instruction and the second instruction comprises a Store Conditional Indexed (stcx) instruction defined in an instruction set for a PowerPC processor.

4. The processor of claim 2 wherein a reservation for the specified memory address comprises a reservation for a cache line that includes the specified memory address.

5. The processor of claim 4 wherein the reservation for the cache line is lost when a store is made to a second memory address in the cache line after the first instruction is executed by the processor and before the second instruction is executed by the processor.

6. The processor of claim 1 wherein the processor further comprises:
a cache memory that includes a plurality of cache lines, wherein a reservation for a specified memory address comprises a reservation for a cache line that includes the specified memory address; and
a load/store unit that indicates to the performance monitor when a reservation loss is due to a store to the cache line that includes the specified memory address.

7. The processor of claim 1 wherein the reason comprises a bit corresponding to an address corresponding to one of the plurality of reservation losses sampled by the performance monitor, wherein a first value of the bit indicates a bad programming reason for reservation loss at the address and a second value of the bit indicates a valid programming reason for reservation loss at the address.

8. The processor of claim 1 wherein a first plurality of the plurality of reservation loss counters each correspond to a different bad programming reason for reservation loss, wherein when the reservation loss is due to bad programming, the performance monitor increments one of the first plurality of reservation loss counters corresponding to a bad programming reason for the reservation loss, wherein the performance monitor further comprises a different reservation loss counter not in the first plurality of the plurality of reservation loss counters, wherein the performance monitor increments the different reservation loss counter when the selected reservation loss is due to valid programming.

9. A method for logging reservation losses in an integrated circuit processor, the method comprising:
detecting a plurality of reservation losses in the processor;
determining a reason for at least one of the plurality of reservation losses;
logging the plurality of reservation losses; and
logging the reason for the at least one of the plurality of reservation losses in a plurality of reservation loss counters by:
incrementing a first of a plurality of reservation loss counters when a selected reservation loss is due to bad programming; and
incrementing a second of the plurality of reservation loss counters when the selected reservation loss is due to valid programming.

10. The method of claim 9 wherein a reservation loss occurs between a first instruction that gains a reservation on a specified memory address and a second instruction that completes operations on the specified memory address.

11. The method of claim 10 wherein the first instruction comprises a Load and Reserve Indexed (larx) instruction and the second instruction comprises a Store Conditional Indexed (stcx) instruction defined in an instruction set for a PowerPC processor.

12. The method of claim 10 wherein a reservation for the specified memory address comprises a reservation for a cache line that includes the specified memory address.

13. The method of claim 12 wherein the reservation for the cache line is lost when a store is made to a second memory address in the cache line after the first instruction is executed by the processor and before the second instruction is executed by the processor.

14. The method of claim 9 wherein a reservation for a specified memory address comprises a reservation for a cache line that includes the specified memory address, the method further comprising:
 a load/store unit in the processor indicating when a reservation loss is due to a store to the cache line that includes the specified memory address.

15. The method of claim 9 wherein the reason comprises a bit corresponding to an address corresponding to one of the plurality of reservation losses sampled by a performance monitor in the processor, wherein a first value of the bit indicates a bad programming reason for reservation loss at the address and a second value of the bit indicates a valid programming reason for reservation loss at the address.

16. The method of claim 9 wherein the reason is indicated in a plurality of reservation loss counters, wherein a first plurality of the plurality of reservation loss counters each correspond to a different bad programming reason for reservation loss and a different reservation loss counter not in the first plurality of the plurality of reservation loss counters correspond to a valid programming reason for the reservation loss, the method comprising:
 when the reservation loss is due to bad programming, incrementing one of the first plurality of reservation loss counters corresponding to a bad programming reason for the reservation loss; and
 when the reservation loss is due to valid programming, incrementing the different reservation loss counter.

17. An integrated circuit processor comprising:
 a cache memory that includes a plurality of cache lines, wherein a reservation for a specified memory address comprises a reservation for a cache line that includes the specified memory address;
 a performance monitor that logs a plurality of reservation losses in the processor and additionally logs a reason for at least one of the plurality of reservation losses, wherein a reservation loss occurs between a first instruction that gains a reservation on a specified memory address and a second instruction that completes operations on the specified memory address, wherein the first instruction comprises a Load and Reserve Indexed (larx) instruction and the second instruction comprises a Store Conditional Indexed (stcx) instruction defined in an instruction set for a PowerPC processor, wherein the reservation for the cache line is lost when a store is made to a second memory address in the cache line after the first instruction is executed by the processor and before the second instruction is executed by the processor, wherein the performance monitor comprises a plurality of reservation loss counters, wherein a first of the plurality of reservation loss counters is incremented when a selected reservation loss is due to bad programming and a second of the plurality of reservation loss counters is incremented when the selected reservation loss is due to valid programming; and
 a load/store unit that indicates to the performance monitor when a reservation loss is due to a store to the cache line that includes the specified memory address.

* * * * *